United States Patent [19]
Graham et al.

[11] Patent Number: 4,538,885
[45] Date of Patent: Sep. 3, 1985

[54] OPTICAL MICROSCOPE SYSTEM

[75] Inventors: Marshall D. Graham, Framingham; Dudley D. Cook, Jr., Acton; Donald L. Gecks, Bedford; Robert Shaw, Concord, all of Mass.

[73] Assignee: Coulter Electronics, Inc., Hialeah, Fla.

[21] Appl. No.: 390,048

[22] Filed: Jun. 18, 1982

[51] Int. Cl.³ ............................................. G02B 21/24
[52] U.S. Cl. ................................... 350/529; 350/530; 350/531
[58] Field of Search ............... 350/529, 530, 531, 532, 350/533, 534, 535, 536

[56] References Cited

U.S. PATENT DOCUMENTS

| | | | |
|---|---|---|---|
| 3,641,648 | 2/1972 | Kalberman | 350/532 X |
| 3,826,558 | 7/1974 | Rosberry et al. | 350/531 |
| 3,848,962 | 11/1974 | Nelson . | |
| 4,040,736 | 8/1977 | Johannsmeier | 356/399 X |
| 4,285,568 | 8/1981 | Elgart | 350/532 X |

FOREIGN PATENT DOCUMENTS

| | | |
|---|---|---|
| 1227821 | 4/1971 | United Kingdom . |
| 1336067 | 11/1973 | United Kingdom . |
| 1365416 | 9/1974 | United Kingdom . |
| 1482654 | 8/1977 | United Kingdom . |
| 1531429 | 11/1978 | United Kingdom . |
| 1588090 | 4/1981 | United Kingdom . |

OTHER PUBLICATIONS

Shack, R. et al., "Ultrafast Laser Scanner Microscope", *The Journal of Histochemistry and Cytochemistry*, vol. 27, No. 1, pp. 153–159, 1979.
Bartels, Peter H., et al., "Ultrafast Laser Scanner Microscope Design and Construction", *Analytical and Quantitative Cytology*, vol. 3, No. 1, pp. 55–66, Mar. 1981.

*Primary Examiner*—John K. Corbin
*Assistant Examiner*—Lynn Vandenburgh Kent
*Attorney, Agent, or Firm*—Lahive & Cockfield

[57] ABSTRACT

An optical microscope system includes an optics system and a frame. A selectively controlled stage assembly is coupled to the frame by vacuum-retained air-bearings. An air vacuum chuck coupled to the stage selectively aligns and supports an object-bearing slide for viewing with the optics system.

10 Claims, 8 Drawing Figures

OPTICAL MICROSCOPE SYSTEM

REFERENCE TO RELATED APPLICATION

The subject matter of this application is related to that of U.S. application Ser. No. 390,049, filed on even date herewith, entitled "Air Vacuum Chuck for a Microscope".

BACKGROUND OF THE INVENTION

The present invention is in the field of optical instruments and more particularly, optical microscopes.

Optical microscopes have long been adapted for viewing objects on planar surfaces of glass slides. Such microscopes generally include an optical system which provides an image of an object in an associated focal plane. A stage, or carrier, assembly holds the object-bearing slide surface substantially parallel to the focal plane of the optics.

Generally, the stage is movable in two perpendicular directions in a plane parallel to the focal plane in order to permit selective movement of a slide mounted on the stage past the field of view of the optics system. In the prior art, these movements are accomplished by mechanical linkages, which, for example, may include ways or bearings. In order to provide relatively high-accuracy control of the movements of the stage, the linkages require precision and correspondingly expensive components. Typically, preloaded mechanical stages may have as much as 50 microns of defocusing motion over a 1-inch by 2-inch slide area. As a result, relatively large ranges of motion are required along the optical axis to provide satisfactory focusing over the range of slide motion. It is known in the prior art to use a vacuum chuck coupled to the stage for supporting a slide against a slide registration surface substantially parallel to the focal plane in an optical microscope, for example, as taught in U.S. Pat. No. 3,848,962. This type of slide mounting apparatus permits satisfactory support for a slide, maintaining the object-bearing surface in a plane parallel to the focal plane for slides having varying wedge or thickness and coverslip thickness.

However, in many applications it is also necessary that an object-bearing slide have a desired alignment which may be repetitively achieved. This is particularly necessary for automated microscopy systems in which a particular location on a slide may be re-accessed a number of times.

It is an object to provide a microscope system which is relatively easy to fabricate at correspondingly low cost.

It is another object of the present invention to provide a microscope system having improved positioning control for object-bearing slides.

It is yet another object to provide a microscope system having an improved method for selectively aligning and supporting a microscope slide.

SUMMARY OF THE INVENTION

Briefly, a microscope system according to the present invention includes an optics system rigidly coupled to a frame. A stage including a device for supporting a microscope slide is positioned between the frame and optics system. Generally, the stage has a planar surface opposed and parallel to a planar surface on the frame. A conventional air-bearing is established between these opposed surfaces so that the stage in effect floats above the frame planar surface on a thin air film provided from a relatively high pressure air reservoir. In some forms of the invention, a vacuum from a vacuum reservoir is also coupled to the bearing region between the opposed surfaces of the frame and the stage. The vacuum in the bearing region provides a retention force which controls the thickness of the air film while permitting use of a stage very low in total mass. The stage can be freely moved over the surface of the frame with practically zero drive force due to the low levels of friction provided by the air bearing, yet likely levels of applied force will neither dislodge the stage nor cause the air film to flatten sufficiently as to result in image defocusing. Moreover, the vacuum-retained air-bearing provides a relatively stiff coupling between the stage and frame. The balance of air supply to vacuum supply can be adjusted to provide desired operating properties (as for example the initial focus) or in manual instruments can be modulated to provide fine focus adjustment. With the present invention, defocusing motions over a 1-inch by 2-inch slide area may readily be limited to be within 1 micron.

In some forms of the invention, the system also includes additional guide elements coupled to the system which limit the motion of the stage on the frame planar surface to be controlled along one or two axes. The guide elements are coupled to the stage and to the frame by vacuum-retained air-bearings in a manner permitting precise control of the stage motion in predetermined directions.

In various forms of the invention, different air and/or vacuum pressures may be applied to any of a plurality of bearings, as for example to provide different stiffness values to compensate for different moving masses, or to control mechanical resonances in one or another axis.

Because of the controlled vacuum-retained air-bearing used to couple the stage to the frame, the configuration of the present invention substantially eliminates need for use of a coarse-focusing mechanism during search over the useful area of a standard microscope slide. As a result, an instrument employing the invention has relatively high performance but low complexity and cost, and when automated applications are involved, relatively straightforward computer programming requirements. Moreover, in many cases, the total required focusing range is within the limits of solid-state actuators, such as piezo-electric or magnetostrictive elements. Generally, all focusing motion in the instrument can be derived from stiff, non-hysteretic members that are much quicker in response and easier to control than are classical mechanical actuators and drives.

In addition, the present invention does not require critically toleranced mechanical components. The only key precision requirement is flatness of the bearing surfaces, which requirements may be readily achieved by standard surface-grinding techniques. Moreover, the reduced parts count and cost for the total assembly, as well as a reduction in the care and skill-level needed to assemble a working instrument, provide a substantial saving in labor and alignment-tooling costs. In addition, the system is mechanically much stiffer overall compared with what is practically possible with conventional systems, thereby permitting increased speed at which the complete microscope can be operated and so permitting greater rates of slide analysis.

Although many of the benefits mentioned accrue particularly to microscopes used in computer-controlled applications, such as automated differential counters, the present invention is also suitable for use in a simple manual instrument, by substitution of manual stage actuation for motorized drive components. This approach permits a complete microscope slide to be searched manually, by the operator moving a carrier in his chosen search pattern without needing to do repeated coarse focusings. Both instrument simplicity and ease of use are improved compared to the prior art, and the manufacturing cost is relatively low.

In some forms of the present invention, a chuck is provided for selectively aligning and supporting an object-bearing planar surface of a microscope slide. The chuck includes a body member having a substantially planar slide-supporting surface. In one form of the invention, a plurality of stop members extend from this slide-supporting surface. Alternatively, the stop members may extend from a fixture attached to the objective lens assembly (or other portion) of the optics system. The stop members are adapted to interferingly engage a slide having its object-bearing surface adjacent to the slide-supporting surface with the slide being in a predetermined orientation. In forms of the invention having stop members extending from a fixture connected to the objective lens assembly, the stop members may be retractable. In that form, once desired alignment is achieved and a slide is rigidly coupled to the slide supporting surface, the stop members are retracted so that the chuck (and slide) may be moved as a unit.

A plurality of air ports and vacuum ports are positioned in the slide supporting surface of the body member. The body member includes internal passageways coupled to the various ports which are adapted to couple the air ports to an external relatively high pressure air reservoir and the vacuum ports to an external vacuum reservoir. At least one of the air ports is adapted to direct airflow from that port directed towards at least one of the stop members. In some forms of the invention, at least one of the air ports is adapted to direct airflow from that port away from at least one of the stop members.

A controller is selectively operable in an ALIGNMENT mode to couple air from the air reservoir to the air ports and for coupling vacuum from the vacuum reservoir to the vacuum ports, establishing a vacuum-retained air bearing. With this configuration, in the alignment mode, the airflow from the air ports and between the slide and the slide supporting surface establishes a relatively frictionless coupling between the object-bearing surface of the slide adjacent to the slide supporting surface and that surface. The vacuum from the vacuum ports establishes an equilibrium separation between the object-bearing slide surface and the slide supporting surface. Moreover, the airflow component from the air ports which is directed towards one or more of the stop members, imparts a net force on the slide in a plane parallel to the object bearing surface and towards at least one of the stop members. By way of example, the net force may be a viscous drag force over the surface of the slide, or a direct force imparted by the airflow against an edge of the slide, or a combination of both. In response to this latter component, a slide adjacent to the slide supporting surface may readily be aligned to the predetermined orientation defined by the stop members.

The controller is selectively operable in a SUPPORT mode for coupling a vacuum from the vacuum reservoir to the vacuum ports. In this case, with no air pressure provided to the air ports, the vacuum from the vacuum ports establishes a net force on a slide adjacent to the slide-supporting surface directed toward that surface. Consequently, in this mode, the slide is held firmly against the slide-supporting surface in the aligned position established during the ALIGNMENT mode.

The vacuum is maintained as the controller is switched from the ALIGNMENT mode to the SUPPORT mode, so that the slide portion is maintained during that switching time.

The controller may also be selectively operable in a RELEASE mode to couple air from the air reservoir to the air ports in order to release the slide for off-loading. In forms of the invention including a second set of air ports in the slide supporting surface adapted for directing air flow away from the stop members, during the ALIGNMENT mode, the controller couples air to all air ports except those in the second set, permitting alignment as described above. In the RELEASE mode, the controller couples air to all air ports except those adapted for directing air flow towards one or more stop members. In this latter mode, the controller may also couple vacuum to the vacuum ports. As a result, a vacuum-retained air bearing is established with a net force applied to the slide away from the stop members to provide off-loading.

BRIEF DESCRIPTION OF THE DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENT

Figure 1:
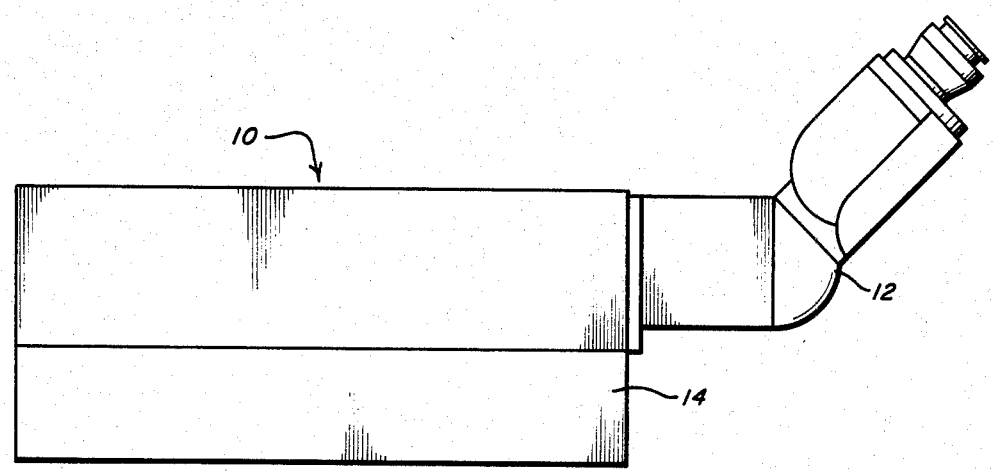
FIG. 1 shows an optical microscope system embodying the present invention.
Figure 2:
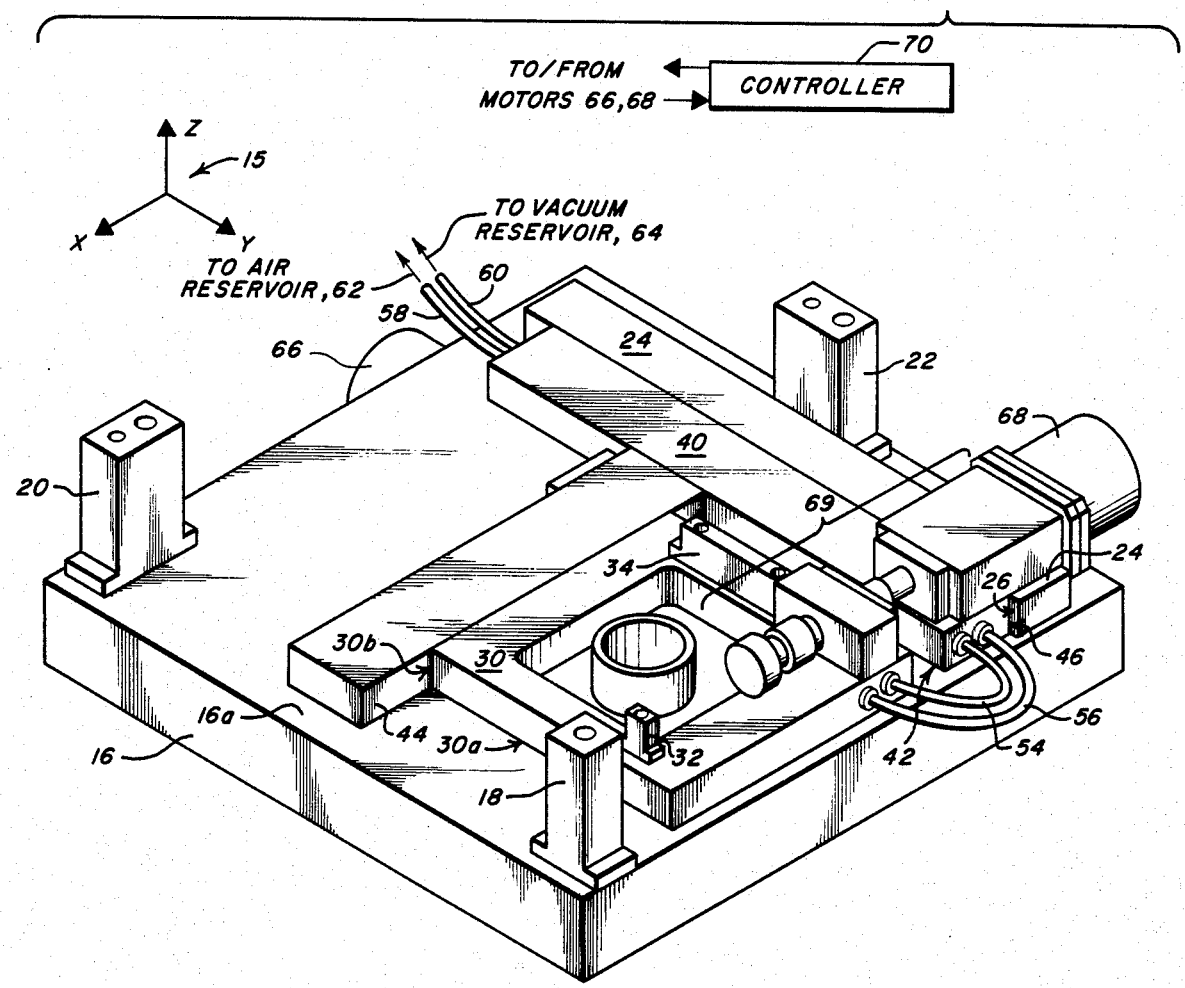
FIG. 2 shows a perspective view of the stage assembly of the system of FIG. 1.
Figure 3:
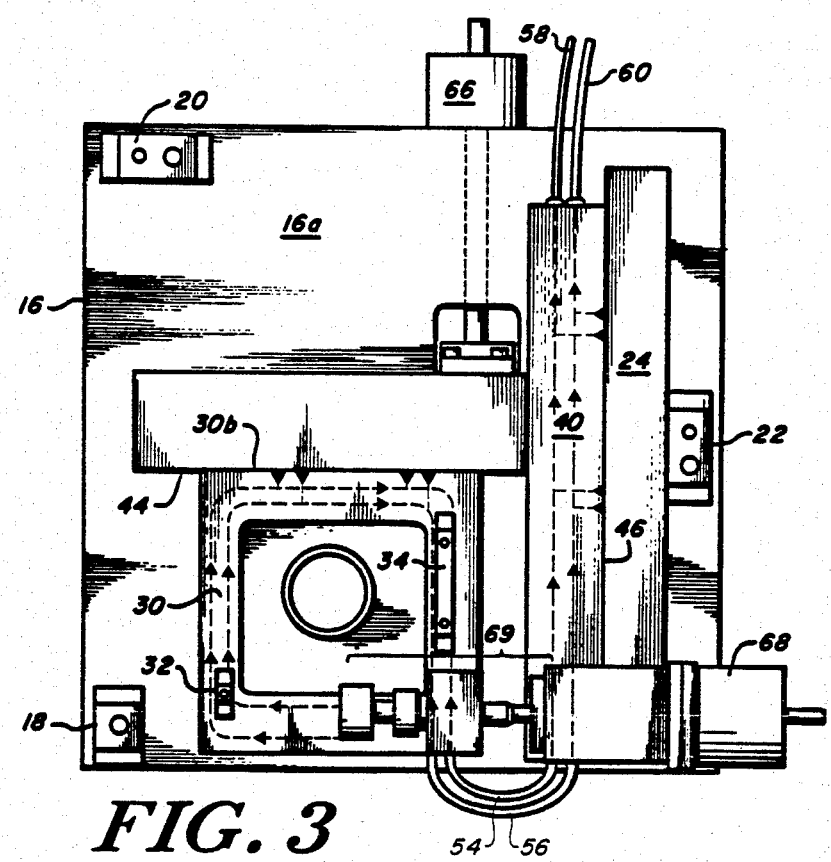
FIG. 3 shows a top view of the stage assembly of the system of FIG. 1.

FIG. 1 shows an optical microscope system 10 embodying the present invention. System 10 includes a microscope optics system 12 and a stage assembly 14. FIGS. 2 and 3 show the stage assembly in detail. FIG. 2 also shows a reference coordinate system 15 having its X-Y plane parallel to the focal plane of optics system 12.

The stage assembly 14 includes a frame member 16 and associated optics support members 18, 20 and 22 for rigidly coupling the optics system 12 to frame member 16. The frame member 16 has a substantially planar upper (as shown) portion 16a which lies in a plane parallel to the focal plane of the optics system 12. This surface 16a is referred to hereafter as the frame bearing surface.

Frame 16 also includes a reference member 24 extending from surface 16a. Member 24 has a substantially planar side surface referred to hereafter as the reference side bearing surface 26. Surface 26 is parallel to the Y-Z plane of coordinate system 15.

A stage 30 is positioned on the frame bearing surface 16a. The lower (as shown) surface of stage 30 is substantially planar. That lower surface is referred to hereafter as stage-to-frame bearing surface 30a.

A slide alignment and supporting chuck 110 (not shown in FIG. 2) is coupled to the stage 30 by way of support members 32 and 34. The chuck 110 is adapted to support a microscope slide with its object-bearing planar surface substantially parallel to the lower surface of stage 30. In the preferred form of the invention, the chuck 110 has the configuration shown in FIGS. 4–7. As described in detail below, that chuck 110 includes a substantially planar slide-supporting surface 114. Support members 32 and 34 rigidly support chuck 110 so that surface 114 is parallel to the lower surface of stage 30. Chuck 110 may be attached to support members 32 and 34 by bolt assemblies passing through holes 126–128 of chuck 110.

In the present embodiment, the stage 30 consists principally of a perimeter portion with a central aperture. A light source and condenser device (not shown) is coupled to the frame 16 and extends into that central aperture of stage 30 to provide illumination from below for a slide held by chuck 110. The central aperture is sufficient to permit free movement of the stage 30 over its range of motion in the X and Y directions without interfering with the condenser.

In the embodiment of FIG. 2, the stage 30 includes a substantially planar stage side surface 30b. The surfaces 30a and 30b are perpendicular.

The stage assembly 14 further includes a "T"-shaped guide member 40 positioned on the frame bearing surface 16a. The lower (as shown) surface of guide member 40 is substantially planar. That lower surface is hereafter referred to as guide-to-frame lower bearing surface 42. Guide member 40 has two other substantially planar surfaces: stage guide surface 44 and guide-to-frame side bearing surface 46. Surfaces 42, 44 and 46 are mutually perpendicular.

The stage 30 and the guide member 40 are positioned with surfaces 30a and 42 adjacent to the frame bearing surface 16a. The guide member 40 is further positioned with its guide-to-frame side bearing surface 46 adjacent to the reference side bearing surface 26. The stage 30 is positioned with respect to the guide member 40 with surfaces 30b and 44 adjacent.

The stage-to-frame bearing surface 30a of stage 30 includes a plurality of air ports and vacuum ports. The air ports in surface 30a are coupled by way of an air line 54, an interior passage in guide member 40, and air line 58 to a relatively high pressure air reservoir 62 (not shown in FIG. 2). The vacuum ports in surface 30a are coupled by way of a vacuum line 56, an interior passage in guide member 40, and vacuum line 60 to a vacuum reservoir 64 (not shown in FIG. 2). The air and vacuum ports in surface 30a are conventionally adapted to establish a vacuum-retained air-bearing whereby the airflow from the air ports maintains the lower surface 30a of stage 30 (and thus the object-bearing surface of the slide coupled to stage 30 by way of chuck 110) substantially in the focal plane of optics system 12, and establishes a substantially frictionless, but due to the vacuum, a relatively stiff, coupling between the stage-to-frame bearing surface 30a and the frame bearing surface 16a.

The guide member 40 includes a plurality of air ports and vacuum ports in the guide-to-frame lower and side surfaces 42 and 46. These air and vacuum ports are coupled by way of interior passages in guide member 40 and a respective one of air line 58 and vacuum line 60 to air reservoir 62 and vacuum reservoir 64, respectively. The ports in the lower bearing surface 42 are adapted to form a vacuum-retained air-bearing so that the airflow from the air ports maintains the guide-to-frame lower bearing surface 42 substantially parallel to the frame-bearing surface 16a and establishes a substantially frictionless, but due to the vacuum, a relatively stiff, coupling between those surfaces. Similarly, the air ports and vacuum ports in the side bearing surface 46 are adapted to form a vacuum retained air bearing so that the air flow from the air ports maintains the guide-to-frame side bearing surface 46 substantially parallel to the reference side bearing surface 26, and establishes a substantially frictionless, but due the vacuum, a relatively stiff, coupling between those surfaces.

The stage side surface 30b also includes a plurality of air ports and vacuum ports which are coupled by way of a respective one of air line 54 and vacuum line 56, internal passages in guide member 40 and a respective one of air line 58 and vacuum line 60 to air reservoir 62 and vacuum reservoir 64, respectively. The air and vacuum ports in surface 30b are adapted to form a vacuum-retained air-bearing so that the airflow from the air ports maintains the stage side surface 30b substantially parallel to the stage guide surface 44 and establishes a relatively frictionless but relatively stiff coupling between those surfaces.

The substantially planar surfaces in the elements 16, 30, 40 and 110 of the stage assembly 14 may readily be provided by conventional surface grinding techniques. With the vacuum-retained air-bearings between those planar surfaces in operation, the guide member 40 is adapted for relatively free motion in the Y-direction, and the stage 30 is adapted for relatively free motion in the X-direction.

With the vacuum-retained air-bearings, the elements 30 and 40 are "floated" adjacent to their respective substrates on a thin air film. The vacuum provides retention force that controls the thickness of the air film while permitting use of moving elements with very low total mass. The stage 30 and guide 40 can be readily moved over the surfaces of their respective substrates with practically zero drive force, yet relatively large levels of applied force will neither dislodge the element nor cause the air film to flatten significantly. As a result, the air film between surfaces 30a and 16a does not change thickness enough to cause image de-focusing. Moreover, this thickness (and thus focus) may be adjusted by controlling the balance of air supply and vacuum supply.

With this configuration, the stage 30 position may be "manually" controlled. By way of example, an operator may directly move the stage 30 by hand with respect to frame 16, or may move stage 30 by way of conventional mechanical linkages.

In the illustrated embodiment, the stage assembly 14 further includes a selectively controlled motor 66 and associated mechanical linkage (not shown) passing through an aperture in frame 16 to the guide member 40 which permits controlled motion of guide member 40 in the Y-direction.

Stage assembly 14 includes a selectively controlled motor 68 and associated lead screw linkage 69 connecting stage 30 to guide member 40. With this configuration, motor 68 may be selectively controlled to adjustably position stage 30 with respect to guide element 40 in the X-direction. Alternatively, other drives, such as cam or wedge drive, may be used.

A controller 70 controls the operation of motors 66 and 68 to provide automated operation of the stage, so that that stage may be selectively positioned to points within a range of motion in the X, Y plane. The controller 70 may be a programmed digital computer which would control stage 30 to permit location and re-location of desired points on a microscope slide. In alternative embodiments, the stage 30 may be adapted for manual control using conventional linkages. In the latter case, in many applications the guide member 40 may not be a necessary element of the system.

In alternative embodiments, the guide member 40 may be "L"-shaped rather than "T"-shaped. Alternatively, a one dimensional control may also be achieved by rigidly connecting the stage 30 to the guide member 40.

With the present configuration, in either the manual embodiment or the automatic embodiment described above, a relatively straightforward design of a microscope stage is provided with minimal numbers of discrete mechanical and structural parts critical in dimension and tolerance.

With this configuration, different air and vacuum pressures may be applied to any of the vacuum-retained air-bearings to provide desired stiffness values to accommodate the different moving masses, or to control mechanical resonances in one or another axis. Moreover, the vacuum-retained air-bearing between stage 30 and frame member 16 may also be controlled to provide fine focusing, i.e. movement of the object-bearing planar surface of a slide coupled to the chuck 110.

FIGS. 4–7 show an exemplary chuck 110 for selectively aligning, supporting, and releasing an object-bearing planar surface of a microscope slide in accordance with the present invention. Chuck 110 includes a body member 112 having a planar slide supporting surface 114. Surface 114 has three stop members 116 through 118 which extend from the slide supporting surface 114. The stop members 116–118 are positioned on surface 114 to interferingly engage the two edges of a conventional 1 inch by 3 inch microscope slide (denoted by reference designation 120 in FIGS. 6–8) and locate the slide adjacent to the slide supporting surface 114 in a predetermined orientation. In alternate forms of the invention, the stop members may extend from a fixture (not shown) attached to the objective (or other portion) of the optics system, rather than from the slide supporting surface. With this latter form, the alignment of the slide is directly related to the optical axis of the optics system. As a result, slides may readily be aligned in the same position with respect to the optical axis on different microscope systems.

The chuck 110 also includes holes 126–128 which are adapted for receiving mounting bolts for rigidly coupling chuck 110 to a microscope stage so that the surface 114 is substantially parallel to the focal plane of the microscope. The central aperture 120 is adapted to permit a microscope objective lens assembly to be adjustably lowered from the top (as shown) to position its focal plane to be coincident with surface 114. In FIG. 1, the objective lens assembly may be adjustably positioned from above (as shown) chuck 110 for focusing. Alternatively, the chuck 110 may be inverted so that the objective lens assembly may be adjustably positioned from below chuck 110 for focusing.

Chuck 110 also includes an air/vacuum slide coupler for coupling the object-bearing surface of a microscope slide to surface 114 of chuck 110. The coupler includes six air ports 130a–130f and two vacuum ports 140a and 140b in the slide supporting surface 114 of member 112. The air ports and vacuum ports are coupled by way of a respective one of passageways 150 and 152 internal to body member 112 and external tubing and valving to a respective one of relatively high pressure (e.g. 20 p.s.i.) air reservoir 131 and vacuum reservoir 141.

Figure 6:
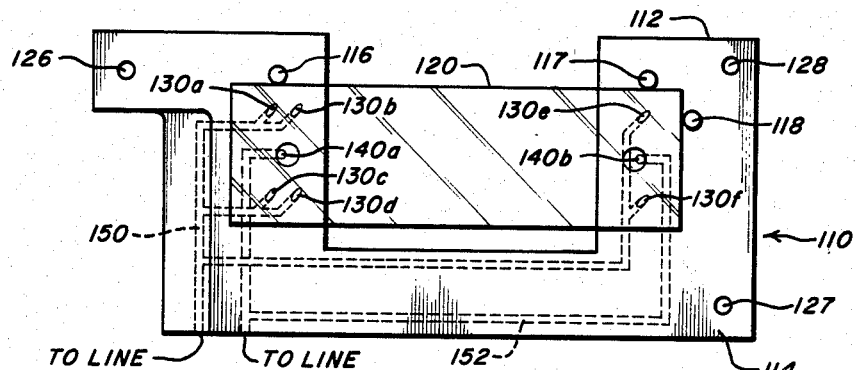
FIG. 6 shows a bottom view of the chuck of FIG. 4.
Figure 7:
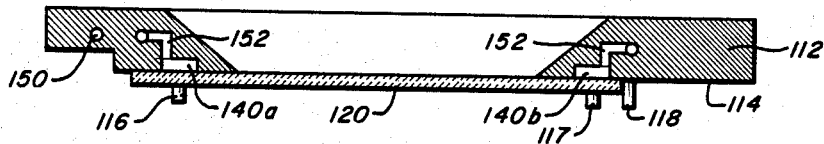
FIG. 7 shows a sectional view along line 7—7 of the body member shown in FIG. 5.

In the illustrated embodiment, air ports 130a–130f and the portions of their associated passageways adjacent to those air ports are configured so that air flow from each of those ports has a component in the direction of at least one of the stop members. In FIG. 6 the internal passageways 150 and 152 are indicated by dash lines.

Figure 4:
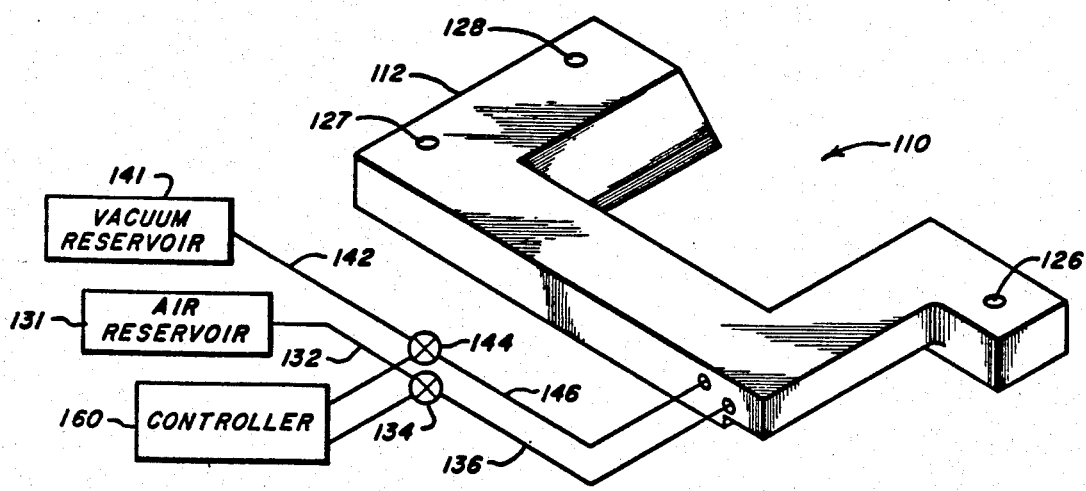
FIG. 4 shows in perspective view, an air vacuum chuck for the system of FIGS. 1-3.
Figure 5:
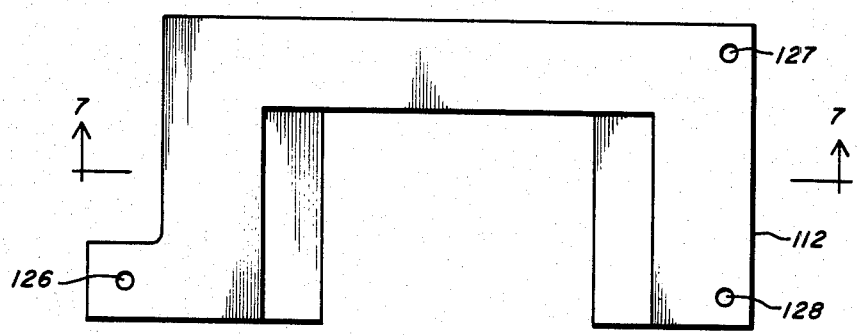
FIG. 5 shows a top view of the chuck of FIG. 4.

As shown in FIG. 4, the high pressure air reservoir 131 is coupled to the air passageway 150 in body member 112 by way of pneumatic line 132, valve 134 and pneumatic line 136. Vacuum reservoir 141 is coupled to the vacuum passageways 152 in body member 112 by way of pneumatic line 142, valve 144, and pneumatic line 146.

A controller 160 is coupled to valves 134 and 144. Controller 160 selectively controls chuck 110 to operate in one of several modes. The mode selection may be manually or automatically controlled. Controller 160 is operative in an ALIGNMENT mode to maintain valves 134 and 144 open and in a SUPPORT mode to maintain valve 134 closed and valve 144 open. The controller 160 may also be operative in a RELEASE mode to maintain valves 134 and 144 both closed, thereby releasing the slide for off-loading. Alternatively, in this mode, valve 134 may be maintained open while valve 144 is maintained closed, or both valves may be maintained open.

With this configuration, in the ALIGNMENT mode, a microscope slide which is positioned with an object-bearing planar surface adjacent to surface 114 is coupled to that surface. In this mode, air and vacuum from ports 130a–130f and 140a–140b, respectively, establish a vacuum retained air bearing so that the coupling between the object-bearing surface of the slide and surface 114 is substantially frictionless. Moreover, due to the directed air flow from air ports 130a–130f, there is a net force on the slide directed towards the stop members 116–118. For example, this net force may be due to viscous drag, or to a direct force against the slide edge, or both. In response to this net force, the slide moves towards the stop members until it rests against those members, thereby establishing a desired alignment. Typically, in operation, following alignment, controller 160 then closes valve 134, establishing the SUPPORT mode.

In the SUPPORT mode, a microscope slide which is positioned with an object-bearing surface adjacent to surface 114 may be held with that object-bearing surface against surface 114. In this mode, valve 134 is closed and vacuum at the vacuum ports 140a and 140b establishes a net force on the slide directed toward surface 114, thereby holding the slide against this surface in the aligned position. Following viewing in the SUPPORT mode, controller 160 may then close valve 144 only, or may open valve 134 and close valve 144, establishing the RELEASE mode.

The chuck 110 may be used with a microscope system, such as that shown in FIGS. 1–3. In operation, a slide which is loaded into the system (either automatically or manually) near the surface 114 of chuck 110, may be easily aligned and then held for viewing. This is accomplished by the controller 160 operating in the ALIGNMENT mode. Following alignment, the controller 160 may then operate in the SUPPORT mode. In that mode, the slide is held against surface 114 for viewing in the aligned position. Following viewing, the controller 160 may then operate in the RELEASE mode, permitting slide removal. The ALIGNMENT-SUPPORT-RELEASE cycle may then be repeated for as many slides as desired.

In the RELEASE mode, the vacuum no longer retains the slide against surface 114, and the slide is thus released, permitting off-loading. The operation of controller 160, where valve 134 is open and valve 144 is closed in the RELEASE mode, is particularly useful in forms of the invention which are inverted with respect to FIG. 4, that is the objective lens assembly is below the slide and the object-bearing surface of the slide is the lower surface of the slide. In this case, the airflow is sufficient to offset gravitational forces on the slide to release it from the slide supporting surface.

Figure 8:
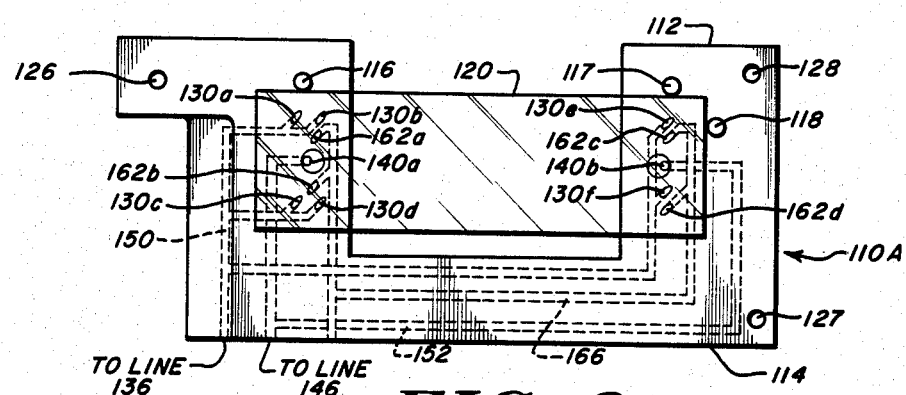
FIG. 8 shows a bottom view of an alternate embodiment of the invention.

FIG. 8 shows a bottom view of an alternate embodiment 110A of the invention. In FIG. 8 elements corresponding to elements in FIGS. 4–7 are denoted by identical reference designations. The chuck 110A is substantially the same as chuck 110 except for a plurality of air ports 162a–d and an internal air passageway 166. The ports 162a–d are adapted to direct airflow from those ports in a direction away from at least ones of the stop members 116–118. The air passageway 166 may be connected to air reservoir 131 by an air line (not shown) and valve 168 (not shown), where the valve is controlled by controller 162. In operation, valve 168 is closed in the ALIGNMENT and SUPPORT mode, and operation is the same as described above in conjunction with FIGS. 4–7. In the RELEASE mode, valve 168 is open and valve 134 is closed. Valve 144 may be open or closed. In the "non-inverted" configuration (i.e. as shown in FIG. 4) a vacuum-retained air bearing is established between the slide and surface 114, together with a net viscous drag force (imparted by the airflow from valves 160a–d) directed away from stop members 116–118, resulting in a controlled off-loading of the slide. The valve 144 may be closed in the "inverted" form, and the slide may be similarly off-loaded. Alternatively, valve 144 may be open, with the result that a vacuum-retained air-bearing is established during off-loading. In the latter form, slide bounce is minimized. The table below sets forth the effect on a slide in the various modes of operation of the chuck system for both the noninverted and inverted embodiments described above.

TABLE

| Mode | Valve 134 | Valve 144 | Effect on Slide Non-Inverted | Inverted |
|---|---|---|---|---|
| ALIGNMENT | Open | Open | Slide moved to desired position | Slide moved to desired position |
| SUPPORT | Closed | Open | Slide held for viewing | Slide held for viewing |
| RELEASE | Closed | Closed | Slide falls | Slide free to move laterally only |
| RELEASE (in position) | Open | Closed | Slide falls | Slide held in desired position; |

TABLE-continued

| Mode | Valve 134 | Valve 144 | Effect on Slide Non-Inverted | Inverted |
|---|---|---|---|---|
| | | | | can be lifted |

The invention may be embodied in other specific forms without departing from the spirit or essential characteristics thereof. The present embodiment is therefore to be considered in all respects as ilustrative and not restrictive, the scope of the invention being indicated by the appended claims rather than by the foregoing description, and all changes which come within the meaning and range of equivalency of the claims are therefore intended to be embraced therein.

We claim:

1. An optical microscope system for viewing a planar object-bearing surface of a microscope slide, comprising:
 A. optics system including means for providing an image of an object in a focal plane,
 B. frame member including means for rigidly coupling said optics system thereto and including a frame bearing surface having a substantially planar portion, said planar portion being substantially parallel to said focal plane,
 C. stage having a substantially planar stage-to-frame bearing surface and including means for supporting said slide with its object-bearing surface substantially parallel to said stage-to-frame bearing surface, said stage being positioned with said stage-to-frame bearing surface adjacent to said frame bearing surface,
 D. stage-to-frame coupling means including:
  i. a plurality of air ports in said stage-to-frame bearing surface,
  ii. means for coupling air from a relatively high pressure air reservoir to said air ports,
 wherein said stage-to-frame coupling means further comprises a plurality of vacuum ports in said stage-to-frame bearing surface and means for coupling vacuum from a vacuum reservoir to said vacuum ports whereby said airflow from said air ports and said vacuum from said vacuum ports maintains said object-bearing surface substantially parallel to said focal plane and establishes a relatively frictionless and relatively stiff coupling between said stage-to-frame bearing surface and said frame bearing surface.

2. A system according to claim 1 further comprising means to selectively control the position of said stage relative to said frame member in the plane parallel to said focal plane.

3. A system according to claim 2 wherein said selective control means is adapted for manual operation.

4. A system according to claim 2 further comprising a computer controller and wherein said selective control means is responsive to said computer controller.

5. A system according to claim 1, wherein said frame member includes a reference member having a reference side bearing surface extending perpendicularly from said frame bearing surface, and wherein said stage further includes at least one substantially planar stage side surface, said stage side surface and said stage-to-frame bearing surface being mutually perpendicular, and further comprising:

A. a guide member including a substantially planar guide-to-frame lower bearing surface and a substantially planar guide-to-frame side bearing surface, a substantially planar stage bearing guide surface, said guide-to-frame lower and side bearing surfaces and said stage guide bearing surface being mutually perpendicular, said guide being positioned with said guide-to-frame lower bearing surface adjacent to said frame bearing surface, said guide-to-frame side bearing surface adjacent to said reference side bearing surface and said stage guide bearing surface adjacent to said stage side surface, B. guide-to-frame coupling means including:
  i. a plurality of air ports and vacuum ports in said guide-to-frame lower and side bearing surfaces,
  ii. means for coupling air from a relatively high pressure reservoir to said air ports and for coupling a vacuum from a vacuum reservoir to said vacuum ports, whereby the airflow from said air ports and the vacuum from said vacuum ports maintain said guide-to-frame lower bearing surface substantially parallel to said frame bearing surface and establish a relatively frictionless and relatively stiff coupling between said guide-to-frame lower bearing surface and said frame bearing surface, and maintains said guide-to-frame side bearing surface substantially parallel to said reference side bearing surface and establishes a relatively frictionless and relatively stiff coupling between said guide-to-frame side bearing surface and said reference side bearing surface, C. means for selectively controlling the position of said guide member with respect to said frame in the direction parallel to said reference side bearing surface, and in a plane parallel to said focal plane.

6. A system according to claim 5 wherein said selective control means is adapted for manual operation.

7. A system according to claim 5 further comprising a computer controller and wherein said selective control means is responsive to said computer controller.

8. A system according to claim 5 further comprising:
  D. stage-to-guide coupling means including:
    i. a plurality of air ports and vacuum ports in said stage side surface,
    ii. means for coupling air from a relatively high pressure air reservoir to said air ports and for coupling a vacuum from a vacuum reservoir to said vacuum ports, whereby the airflow from said air ports and the vacuum from said vacuum ports maintains said stage side surface substantially parallel to said stage guide bearing surface, and establishes a relatively frictionless and relatively stiff coupling between said stage side surface and said stage guide bearing surface, and E. means for selectively controlling the position of said stage with respect to said guide member in the direction parallel to said guide bearing surface and in a plane parallel to said focal plane.

9. A system according to claim 8 wherein said selective control means are adapted for manual operation.

10. A system according to claim 8 further comprising a computer controller and wherein said selective control means are responsive to said computer controller.

* * * * *

UNITED STATES PATENT AND TRADEMARK OFFICE
CERTIFICATE OF CORRECTION

PATENT NO.  : 4,538,885
DATED       : September 3, 1985
INVENTOR(S) : Marshall Donnie Graham and David D. Cook, Jr.

It is certified that error appears in the above-identified patent and that said Letters Patent is hereby corrected as shown below:

Column 2, line 55; change "requirements" to read --requirement--.

Column 6, line 11; add hyphen between "vacuum" and "retained".

Column 7, line 60; delete "120".

Column 8, line 43; add hyphen between "vacuum" and "retained".

Column 9, line 31; change "ones" to read --one--.

Column 9, line 35; change "controller 162" to read --controller 160--.

Column 9, line 42; between "114" and the comma insert "If valve is open".

Column 9, line 44; change "valves 160 a-d" to read --ports 160 a-d--.

UNITED STATES PATENT AND TRADEMARK OFFICE
CERTIFICATE OF CORRECTION

PATENT NO. : 4,538,885

DATED : September 3, 1985

INVENTOR(S) : Marshall Donnie Graham and David D. Cook, Jr.

It is certified that error appears in the above-identified patent and that said Letters Patent is hereby corrected as shown below:

At column 7, after line 34, insert the following text

--In alternate embodiments, the internal air and vacuum passageways to the respective bearing surfaces may be individually controlled. For example, vacuum may be coupled to the vacuum ports of surface 30a while the air to the air ports of surface 30a are cut-off. With this configuration, the stage 30 is held rigidly to surface 16a, permitting viewing of a jitter-free image. Similarly, vacuum may be coupled to the vacuum ports of surface 30b or 46, while airflow is cut-off to the air ports of one of those surfaces. As a result, the stage 30 may be controllably driven in the direction of either the X or Y axis, depending on which set of vacuum ports is coupled to the vacuum.

UNITED STATES PATENT AND TRADEMARK OFFICE
CERTIFICATE OF CORRECTION

PATENT NO. : 4,538,885
DATED : September 3, 1985
INVENTOR(S) : Marshall Donnie Graham and David D. Cook, Jr.

It is certified that error appears in the above-identified patent and that said Letters Patent is hereby corrected as shown below:

In all of the air-vacuum bearing surfaces, one or more of the air ports in surfaces 30a, 30b and/or 46 may be adapted to form directed airflows which apply forces to the respective opposing elements. These forces may be used to drive those respective elements, permitting the elimination of relatively expensive stepper motors and associated lead screws which might otherwise be used for driving those elements. Moreover, the opposing surfaces may be suitably grooved to facilitate incremental motion of the movable elements.--

Signed and Sealed this

Twelfth Day of August 1986

[SEAL]

Attest:

DONALD J. QUIGG

Attesting Officer       Commissioner of Patents and Trademarks